United States Patent [19]

Matheson et al.

[11] Patent Number: 4,738,422
[45] Date of Patent: Apr. 19, 1988

[54] ADJUSTABLE TILT/SWIVEL/CABLE DRESS

[75] Inventors: Anthony Matheson, Bedford, Mass.; Roger A. Dugas, Chester, N.H.

[73] Assignee: Hewlett-Packard Company, Palo Alto, Calif.

[21] Appl. No.: 929,547

[22] Filed: Nov. 10, 1986

[51] Int. Cl.⁴ .............................................. F16M 13/00
[52] U.S. Cl. ................................... 248/183; 248/1 F; 248/349; 248/418
[58] Field of Search ............... 248/661, 663, 660, 664, 248/371, 415, 418, 183, 181, 288.3, 349, 1 F, 1 H, 1 I, 179; 108/138, 139; 403/114, 116, 74

[56] References Cited

U.S. PATENT DOCUMENTS

| | | | |
|---|---|---|---|
| 4,068,961 | 1/1978 | Ebner | 248/181 |
| 4,354,654 | 10/1982 | Werner | 248/371 |
| 4,494,720 | 1/1985 | Gregory | 248/371 |
| 4,533,105 | 8/1985 | Cornwell | 248/183 |
| 4,549,710 | 10/1985 | Prince | 248/1 F |
| 4,554,590 | 11/1985 | Chelin | 248/181 |
| 4,564,166 | 1/1986 | Craft | 248/183 |
| 4,570,892 | 2/1986 | Czech | 248/183 |
| 4,645,153 | 2/1987 | Granzow | 248/181 |

Primary Examiner—J. Franklin Foss
Assistant Examiner—Robert A. Olson
Attorney, Agent, or Firm—Donald N. Timbie

[57] ABSTRACT

A mounting assembly in which a monitor can be mounted to a plate having a downwardly extending spherical wall that rides on an annular ridge around the periphery of a circular opening in a formed based. A radial slot is formed through the spherical wall, and ports through which cables can pass are also formed through the spherical wall parallel with the slot. A plate having apertures aligned with the ports is fastened to the base by a stud that extends through the slot.

6 Claims, 3 Drawing Sheets

ADJUSTABLE TILT/SWIVEL/CABLE DRESS

BACKGROUND OF INVENTION

It is often desirable to be able to easily tilt certain types of apparatus in a given plane and to swivel it about a vertical axis in order to make it easier to see images formed thereon and to adjust various controls. Mounting assemblies for this purpose have been comprised of a base that can be secured to a table top and a platform on which the apparatus is mounted that can be tilted and swiveled with respect to the base. These functions are provided by a spherically shaped bottom surface on the platform that rests in an upwardly extending annular ridge on the base and a straight slot in the spherical bottom of the platform through which a vertical pivot pin that is rigidly mounted to the base extends. The platform can only be tilted in the vertical plane of the slot and can be rotated about the pivot pin regardless of where it is in the slot. Leads or tubes required for operation of the apparatus are passed between the apparatus and the platform, through an aperture in the bottom spherical surface and an opening in the base that lies inside the annular ridge. The amount of swivel is limited by the leads coming in contact with an edge of the opening in the base. This is undesirable as sufficient force can easily be applied to the leads to cause them to be pulled loose. Furthermore, the angle through which the platform can be swiveled is limited if the pivot pin is to be inexpensively and securely mounted. Any arrangement of simple means for limiting the angle of swivel so as to avoid contact between the wires and tubes and the edges of the opening in the base is complicated by the tilting of the platform with respect to the base.

BRIEF DESCRIPTION OF THE INVENTION

It is to be noted that in the apparatus of the prior art briefly described above, the vertical plane of the tilt is determined by the pin sliding in the slot and the vertical axis about which the platform swivel is the axis of the pin.

In a preferred embodiment of this invention, a downwardly extending annular ridge is formed on the underside of the base that is coaxial with an upwardly extending annular ridge thereon, and a plate is provided having tabs that contact the downwardly extending annular ridge at various points about its periphery so that the axis of rotation of the plate is the common axis of the annular ridges. Means are provided for keeping the plate in contact with the base. This could be accomplished by a pin mounted on the plate and extending through a slot in the spherical bottom surface of the platform but other means could be used, e.g., the plate could rest on the table top in which the base is mounted.

Leads for the apparatus are entrained between the platform and the base, through ports in the spherical bottom of the platform, through an opening in the base that is within the annular ridges and through an aperture in the plate.

Restriction of the plane on which the platform is tilted as well as swiveling the plate with the platform is preferably attained by the sliding action between at least one straight vertical surface extending from the spherical bottom surface of the platform and a straight vertical surface on said plate. In a preferred embodiment vertical sleeve-like extensions from the edges of the port are provided that are long enough to pass through the aperture in the plate that is in registration with them. The platform can be made to tilt until an extension strikes the edge of the aperture.

Since the plate rotates with the platform but does not tilt, the maximum amount of swivel can be set at nearly one revolution by interference between an outwardly extending tab and a stop on the base.

DETAILED DESCRIPTION OF THE INVENTION

Figure 1:
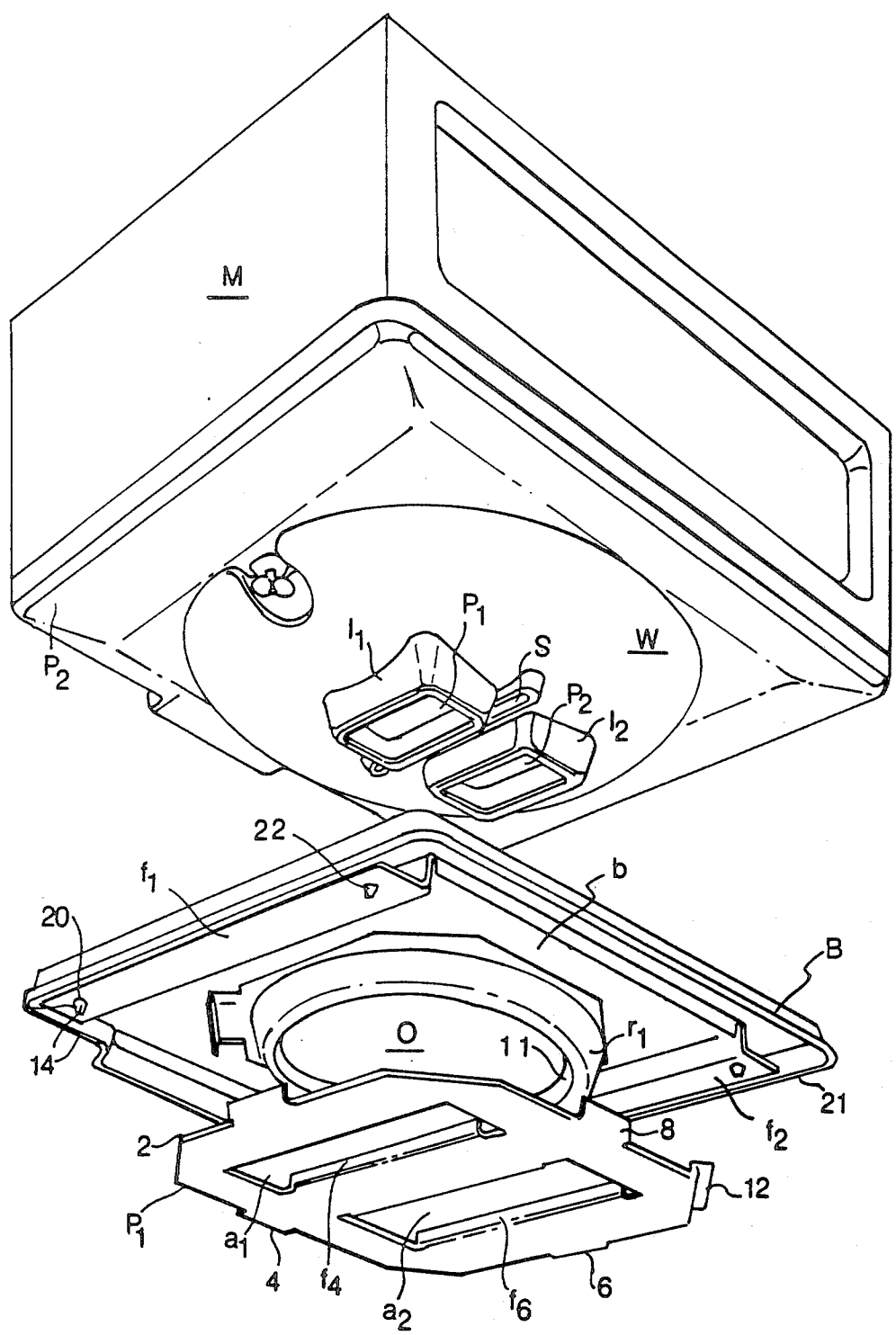
FIG. 1 is an exploded view of the mounting assembly with a view into the bottom side of the spherical wall of the platform.

The components of the assembly are designated in the same manner in each Figure of the drawings. A base B that maybe vacuum formed from plastic has a circular opening O surrounded by a downwardly extending annular ridge $r_1$. A mounting bracket b having outwardly extending flanges $f_1$ and $f_2$ is fastened in any suitable manner to the underside of the base B. A plate $P_1$ has upwardly extending tabs 2,4,6 and 8 that contact the outside of the ridge $r_1$. A platform $P_2$ has a downwardly extending spherical thin wall W. A central radius of the wall W coincides with an axis 10 of the circular opening O in the base B when the platform $P_2$ is in a horizontal position. The spherical wall W rests on an annular ridge $r_2$ shown by a dashed line in FIG. 1. The ridge $r_2$ extends upwardly from the base B and is concentric with the downwardly extending ridge $r_1$. A straight slit S is formed through the wall W that extends through the axis 10. Ports $p_1$ and $p_2$ are formed on either side of the silt S. Extensions $e_1$ and $e_2$ respectively extend downwardly from the edges of the ports $p_1$ and $p_2$. The extensions $e_1$ and $e_2$ pass through the opening O in the base B and into apertures $a_1$ and $a_2$ in the plate $P_1$. A monitor M or other apparatus is mounted on the platform $P_2$ in any suitable manner with its center of gravity preferably in a plane perpendicular to the direction of tilt, passing through the axis 10 and no higher than the center of rotation of the spherical surface W. As the monitor M is turned about the axis 10 or tilted, the spherical wall W slides on the annular ridge $r_2$ as required.

Figure 2:
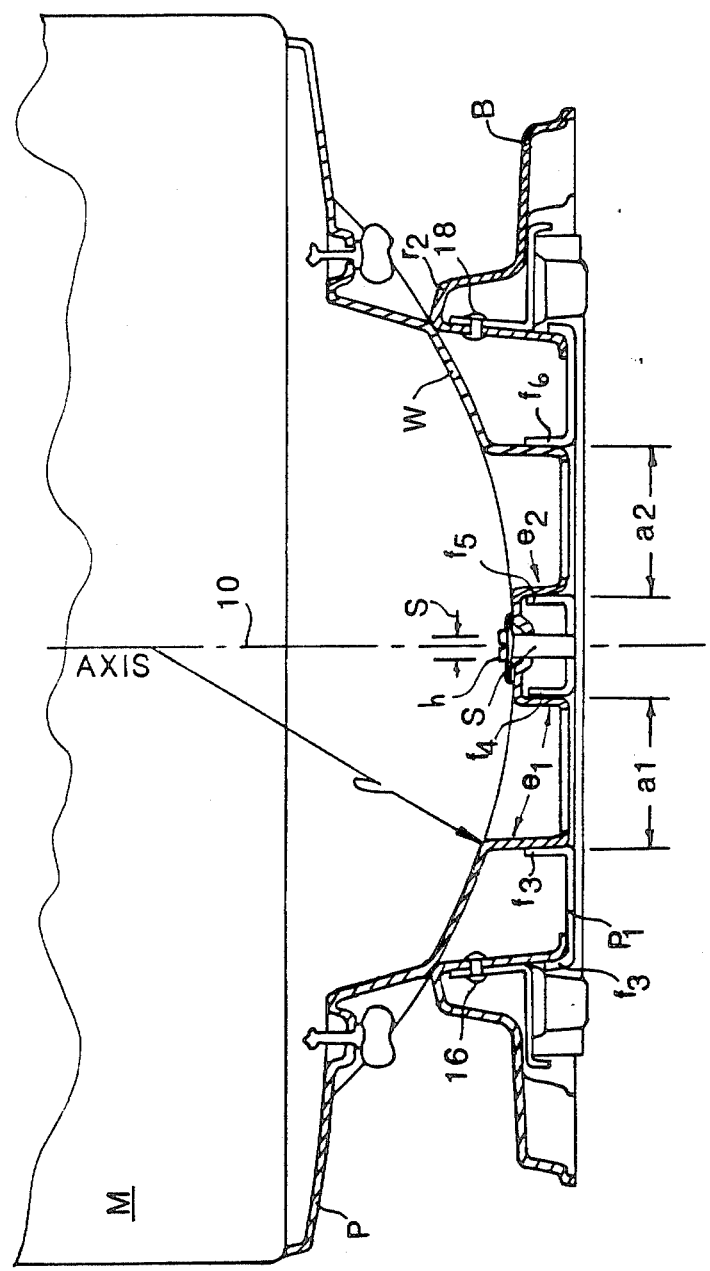
FIG. 2 is a cross-sectional view taken perpendicular to the axis of the annular ridges and perpendicular to the radial slit.

FIG. 2 is a cross-section of the parts just described when they are assembled and is taken through the axis 10 and perpendicular to the middle of the slit S. A stud s that is fastened to the center of the plate $P_1$ extends upwardly along the axis 10 through the opening O in the base B and through the slit S, and a head h is screwed into the stud s so as to prevent the stud from being drawn through the slit S. Upwardly extending flanges $f_3$, $f_4$, $f_5$ and $f_6$ are formed along the edges of the apertures $a_1$ and $a_2$ in $P_1$ respectively, and the extensions $e_1$ and $e_2$ snugly fit inside of them so that rotation of the platform $P_2$ on which M is mounted causes the plate $P_1$ to rotate also. In order to limit the rotation to one revolution, a tab 12 is provided that extends outwardly from one corner of the plate $P_1$ so as to strike a tab 14 on the underside of the bracket b at one point in the revolution of $P_1$. The bracket b is annular and is attached to the base B by any such means such as bolts 16 and 18. If desired, a number of rubber feet such as 20 and 22 can be attached in any suitable manner to the flanges $f_1$ and $f_2$ of the bracket b.

Figure 3:
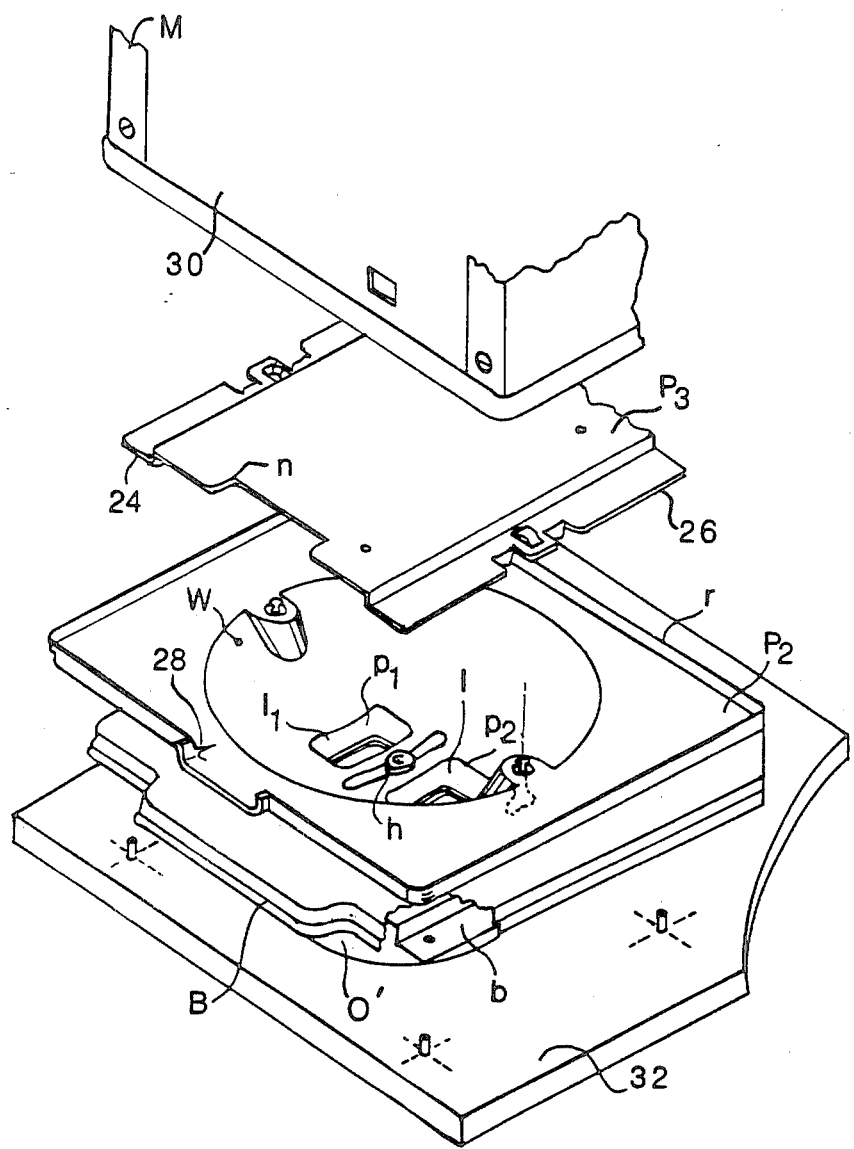
FIG. 3 is an exploded view of the mounting assembly with a view into the upper side of the spherical wall of the platform.

In FIG. 3 the means for mounting the monitor M on the upper side of the platform $P_2$ is shown as being a third plate $P_3$ having downwardly extending angles 24 and 26 that fit inside and touch a ridge r that extends upwardly from the platform $P_2$. A break 28 in the ridge r and a notch n in the third plate $P_3$ provide a path through which leads, not shown, from the back 30 of the monitor M may be passed into the upper side of the spherical wall or shell W. From there they can be passed through the ports $p_1$ and $p_2$, the extensions $e_1$ and $e_2$, the apertures $a_1$ and $a_2$ in the plate $P_1$ and through the opening O that is within the annular ridges $r_1$ and $r_2$. The bracket b may be secured by screws to a table top 32 in a location such that the opening O in the base B is axially aligned with an opening O' in the table 32.

It can be seen that the flanges $f_3$, $f_4$, $f_5$, and $f_6$ form planar surfaces that are perpendicular to a radius from the axis 10 and respectively in sliding surface to surface contact with planar surfaces on the adjacent respective sides of the sleeve-like extensions $e_1$ and $e_2$. The surface to surface contact of the planar surfaces causes the plate $P_1$ to rotate about the axis 10 with the platform $P_2$, and the tab 12 and projection 14 limit the swivel to slightly less than one turn. The amount of tilt is limited in this embodiment by the stud s striking the ends of the slot S. The tilt could be limited by the extension $e_1$ and $e_2$ striking the ridge $r_2$ in which event, the stud or pin s would prevent the assembly from being pulled apart if one were to attempt to lift the platform $P_2$ or to tilt the platform $P_2$ too far. Because the plate $P_1$ determines the axis of rotation of the platform $P_2$, the stud s does not need to be circular in cross-section as in the prior art. The wires from the apparatus M pass through the notch n in between M and the platform $P_2$ through one or both extensions $e_1$ and $e_2$ through opening O and either or both of the apertures $a_1$ and $a_2$.

What is claimed:

1. An assembly for permitting apparatus mounted thereon to be rotated about a vertical axis and tilted about an horizontal axis comprising, a base having means defining an opening extending therethrough, means forming a first annular ridge extending from the top of said base and surrounding said opening, means forming a second annular ridge extending from the bottom of said base and surrounding said opening, said second annular ridge being coaxial with said first annular ridge, a platform for supporting apparatus on its top having a spherical surface extending from its bottom that rests on said first annular ridge, means defining a port extending through said spherical surface and said platform, means defining a radial slot in said spherical surface, a pin extending through said slot and having a head for retaining the pin in said slot, a plate attached to said pin so as to be retained in sliding contact with said second annular ridge, means defining an aperture in said plate that is radially within said second annular ridge, means projecting downwardly from said spherical surface extending through said opening and said aperture whereby said plate rotates with said platform, and means respectively mounted on said plate and on said base for limiting rotation of said platform with respect to said base to one revolution by contact with one another.

2. An assembly as set forth in claim 1 in which
   said means projecting downwardly from said spherical surface is in the form of a sleeve extending from the periphery of said port.

3. An assembly as set forth in claim 1 in which said port is adjacent to said radial slot.

4. An assembly as set forth in claim 1 having apparatus mounted on said platform, the center of gravity of said apparatus being in a line perpendicular to the axis of said annular ridges, perpendicular to the plane of tilt and vertically placed below the center of curvature of the spherical surface.

5. An assembly as set forth in claim 1 having in addition an apparatus mounted on said platform, said apparatus having a center of gravity in a line perpendicular to the axis of said annular ridges, perpendicular to the plane of tilt and vertically placed below the center of curvature of the spherical surface.

6. A mounting assembly as set forth in claim 1, and apparatus mounted on said platform, the center of gravity of said apparatus being in a plane perpendicular to the direction of tilt and passing through said axis and no higher than the center of rotation of said spherical surface.

* * * * *